US008270386B2

(12) United States Patent
Senda

(10) Patent No.: US 8,270,386 B2
(45) Date of Patent: Sep. 18, 2012

(54) TIME SLOT CONTROL METHOD, COMMUNICATION SYSTEM, COMMUNICATION APPARATUS, AND STORAGE MEDIUM

(75) Inventor: Mitsuharu Senda, Tokyo (JP)

(73) Assignee: Kyocera Corporation, Kyoto (JP)

( * ) Notice: Subject to any disclaimer, the term of this patent is extended or adjusted under 35 U.S.C. 154(b) by 941 days.

(21) Appl. No.: 12/064,953

(22) PCT Filed: Aug. 29, 2006

(86) PCT No.: PCT/JP2006/316988
§ 371 (c)(1),
(2), (4) Date: Feb. 26, 2008

(87) PCT Pub. No.: WO2007/026700
PCT Pub. Date: Mar. 8, 2007

(65) Prior Publication Data
US 2009/0103510 A1    Apr. 23, 2009

(30) Foreign Application Priority Data
Aug. 29, 2005   (JP) .................. 2005-248472

(51) Int. Cl.
*H04J 3/00*     (2006.01)
(52) U.S. Cl. ........................... 370/344; 370/345
(58) Field of Classification Search .......... 370/318, 370/345, 328, 329; 455/450, 61, 67.13, 102–111, 455/228, 502; 375/260, 276
See application file for complete search history.

(56) References Cited

U.S. PATENT DOCUMENTS 6,452,964 B1   9/2002 Yoshida
6,650,649 B1   11/2003 Muhammad et al. ......... 370/402
(Continued)

FOREIGN PATENT DOCUMENTS
JP         09-098127        4/1997
(Continued)

OTHER PUBLICATIONS

Japanese language office action dated Feb. 1, 2011 and its English language translation for corresponding Japanese application 2005248472 cites the foreign patent documents above.

(Continued)

*Primary Examiner* — Ian N. Moore
*Assistant Examiner* — Thai Nguyen
(74) *Attorney, Agent, or Firm* — DLA Piper LLP (US)

(57) ABSTRACT

It is an object of the present invention to make it possible to obtain an appropriate receiving environment in a communication system using a slot connecting transfer system. A mobile communication system (1) includes a transmitting part (13) sequentially transmitting time slots containing communication signals, an S/N ratio acquiring part (24) acquiring receiving environment information that indicates the receiving environment in mobile station apparatuses (20) of the respective transmitted time slots, a request generating part (26) determining whether or not at least some of the control bit sequences for a continuous plurality of time slots are to be represented by the control bit sequence of a single time slot on the basis of the amount of variation in the receiving environment indicated by the acquired receiving environment information, and a time slot control part (18) that operates so that at least some of the control bit sequences for a continuous plurality of time slots are represented by the control bit sequence of a single time slot when a base station apparatus (10) transmits time slots, in accordance with the determination results.

7 Claims, 6 Drawing Sheets

U.S. PATENT DOCUMENTS

| | | | |
|---|---|---|---|
| 2002/0057666 A1* | 5/2002 | Hamabe et al. | 370/345 |
| 2003/0072274 A1* | 4/2003 | Futakata et al. | 370/311 |
| 2003/0099209 A1* | 5/2003 | Laakso et al. | 370/311 |
| 2004/0002353 A1* | 1/2004 | Frantti | 455/522 |
| 2004/0039830 A1* | 2/2004 | Zhang et al. | 709/230 |
| 2004/0087329 A1 | 5/2004 | Shinoi | 455/522 |
| 2004/0120357 A1* | 6/2004 | Kekki | 370/521 |
| 2004/0233869 A1* | 11/2004 | Uchida | 370/329 |
| 2005/0025254 A1* | 2/2005 | Awad et al. | 375/295 |
| 2005/0090273 A1* | 4/2005 | Jin et al. | 455/502 |
| 2006/0194602 A1* | 8/2006 | Rudrapatna | 455/522 |
| 2006/0198450 A1* | 9/2006 | Cheng et al. | 375/260 |

FOREIGN PATENT DOCUMENTS

| | | |
|---|---|---|
| JP | 10107756 A | 4/1998 |
| JP | 11355373 A | 12/1999 |
| JP | 2000-138693 | 5/2000 |
| JP | 2003-198443 | 7/2003 |
| JP | 2003244070 A | 8/2003 |
| JP | 2004-530379 | 9/2004 |
| JP | 2004-297127 | 10/2004 |
| JP | 2004-363712 | 12/2004 |
| JP | 2005-136773 | 5/2005 |
| WO | WO 00/51307 A1 * | 8/2000 |

OTHER PUBLICATIONS

Japanese language office action dated Jun. 28, 2011 and its partial English language translation for corresponding Japanese application 2005248472 cites the foreign patent document above.

* cited by examiner

TIME SLOT CONTROL METHOD, COMMUNICATION SYSTEM, COMMUNICATION APPARATUS, AND STORAGE MEDIUM

CROSS-REFERENCE TO THE RELATED APPLICATIONS

This application is a national stage of international application No. PCT/JP2006/316988 filed Aug. 29, 2006, which also claims benefit of priority under 35 U.S.C. §119 to Japanese Patent Application No. 2005-248472 filed on Aug. 29, 2005, the entire contents of which are incorporated by reference.

TECHNICAL FIELD

The present invention relates to a time slot control method, a communication system, a communication apparatus, and a storage medium.

BACKGROUND ART

Mobile communication systems include systems in which one modulation scheme is selected from a plurality of modulation schemes when signals are modulated. Systems which are devised so that this selection is performed automatically are called adaptive modulation schemes. In mobile communication systems using adaptive modulation schemes, each communication apparatus determines the modulation scheme of the signal to be transmitted next by this communication apparatus on the basis of the received power, which is one piece of receiving environment information indicating the receiving environment of signals received from the communication counterpart (for example, see Patent Document 1). The reason for this is that the received power required in order to receive signals (necessary received power) differs according to the modulation scheme.

Ordinarily, this adaptive modulation is performed in each time slot. Each time slot includes a header portion which contains a control bit sequence, and a payload portion which contains the communication content, in the stated order. An adaptive modulation scheme is performed so that the header portion is transmitted and received by a predetermined modulation scheme, and information indicating the modulation scheme of this time slot is contained in the control bit sequence contained in the header portion. The receiver demodulates the payload portion of this time slot using the modulation scheme indicated by this information.

[Patent Document 1] Japanese Laid-Open Patent Application No. 2004-297127

DISCLOSURE OF THE INVENTION

Problem to be Solved by the Invention

The applicant has examined the introduction of a slot connecting transfer system using time slot groups in which control bit sequences are unified (hereafter referred to as connected time slots) in the mobile communication systems. In such slot connecting transfer systems, at least some of the control bit sequences for a continuous plurality of time slots are represented by the control bit sequence of a single time slot, so that the header portion is shortened and the payload portion is lengthened, thus increasing the through rate.

However, in such slot connecting transfer systems, in cases in which the control bit sequences used to transmit the modulation scheme to the communication counterpart among the control bit sequences for the time slots making up the connected time slots are represented by the control bit sequence of a single time slot, in the case of the adaptive modulation scheme, the same modulation scheme is unavoidably used for the respective time slots making up the connected time slots. In other words, if a slot connecting transfer system is used, the control of the modulation scheme becomes rough compared to cases in which such the slot connecting transfer system is not used, and cases in which an appropriate receiving environment cannot be obtained may arise.

Accordingly, it is an object of the present invention to provide a time slot control method, communication system, communication apparatus, and storage medium which make it possible to obtain an appropriate receiving environment in a communication system using a slot connecting transfer system.

Means for Solving the Problem

A time slot control method according to the present invention for solving the problems is a time slot control method wherein in a communication system having a first communication apparatus and a second communication apparatus, the first communication apparatus transmits time slots to the second communication apparatus, the time slot control method includes: a transmitting step of sequentially transmitting time slots having a communication signal from the first communication apparatus to the second communication apparatus; a receiving environment information acquisition step of acquiring receiving environment information that indicates a receiving environment of each of the transmitted time slots in the second communication apparatus; a determining step of determining whether or not at least some control bit sequences for a continuous plurality of time slots are to be represented by a control bit sequence of a single time slot on the basis of an amount of variation in the receiving environment indicated by the acquired receiving environment information; and a time slot control step of operating so that at least some of the control bit sequences for the continuous plurality of time slots are represented by the control bit sequence of the single time slot when the first communication apparatus transmits the time slots in the transmitting step, in accordance with the determination results in the determining step.

In this way, it is possible to determine whether or not to use a slot connecting transfer system on the basis of the amount of variation in the receiving environment; accordingly, an appropriate receiving environment can be obtained in a communication system using a slot connecting transfer system.

Furthermore, the time slot control method may be devised so that in the determining step, in a case in which the amount of variation in the receiving environment indicated by the acquired receiving environment information is greater than a predetermined threshold value, it is determined that at least some of the control bit sequences for a continuous plurality of time slots are not represented by the control bit sequence of a single time slot.

Furthermore, these time slot control methods may be devised so that these methods further include: a modulation scheme determination step of determining a modulation scheme used when the time slots are transmitted in the transmitting step, on the basis of the receiving environment indicated by the acquired receiving environment information; wherein in the transmitting step, the determined modulation scheme is used for the time slots transmitted in the transmitting step by the first communication apparatus.

Furthermore, each of the time slot control methods may be devised so that the receiving environment information acquisition step acquires information indicating received power in the second communication apparatus for each of the transmitted time slots as the receiving environment information.

Furthermore, a communication system according to the present invention is a communication system having a first communication apparatus and a second communication apparatus, wherein the first communication apparatus includes: transmitting means for sequentially transmitting time slots; and the second communication apparatus includes: receiving environment information acquisition means for acquiring receiving environment information that indicates a receiving environment of each of the transmitted time slots; determining means for determining whether or not at least some control bit sequences for a continuous plurality of time slots are to be represented by a control bit sequence of a single time slot on the basis of an amount of variation in the receiving environment indicated by the acquired receiving environment information; and time slot control means for operating so that at least some of the control bit sequences for the continuous plurality of time slots are represented by the control bit sequence of the single time slot when the first communication apparatus transmits the time slots using the transmitting means, in accordance with the determination results of the determining means.

Furthermore, a communication apparatus according to the present invention is a communication apparatus including: receiving means for sequentially receiving time slots from another communication apparatus; receiving environment information acquisition means for acquiring receiving environment information that indicates the receiving environment of the sequentially received time slots; determining means for determining whether or not at least some control bit sequences for a continuous plurality of time slots are to be represented by a control bit sequence of a single time slot on the basis of the amount of variation in the receiving environment indicated by the acquired receiving environment information; and transmitting means for transmitting information indicating results of the determination to the another communication apparatus.

Furthermore, a storage medium according to the present invention is a computer-readable storage medium storing a program for making a computer function as: receiving means for sequentially receiving time slots from another communication apparatus; receiving environment information acquisition means for acquiring receiving environment information that indicates the receiving environment of the sequentially received time slots; determining means for determining whether or not at least some control bit sequences for a continuous plurality of time slots are to be represented by a control bit sequence of a single time slot on the basis of an amount of variation in the receiving environment indicated by the acquired receiving environment information; and transmitting means for transmitting information indicating results of the determination to the another communication apparatus.

BEST MODE FOR CARRYING OUT THE INVENTION

An embodiment of the present invention will be described below with reference to the drawings.

Figure 1:
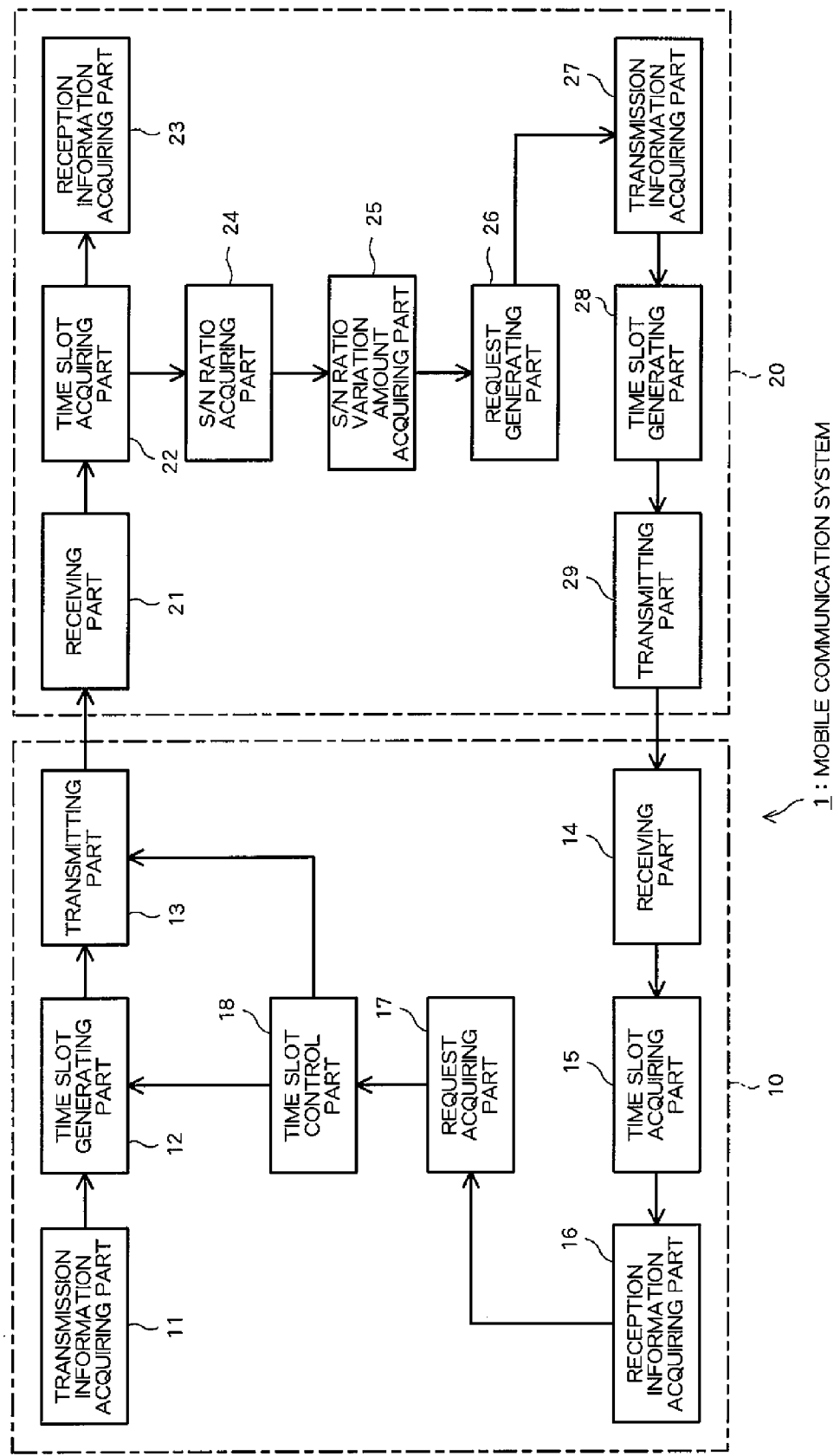
FIG. 1 is a diagram showing a system configuration and functional blocks of a mobile communication system according to an embodiment of the present invention.

FIG. 1 is a diagram showing a system configuration and functional blocks of a mobile communication system 1 according to the present embodiment. As shown in this diagram, the mobile communication system 1 includes a base station apparatus 10 and a mobile station apparatus 20. The base station apparatus 10 and mobile station apparatus 20 are both communication apparatuses, each apparatus having a CPU and a memory. The base station apparatus 10 and mobile station apparatus 20 perform communications by time division multiplex.

In time division multiplex communications, uplink frames having a predetermined time length and downlink frames having a predetermined time length are continuously and alternately transmitted and received. Furthermore, the "uplink frames" are frames that are transmitted from the mobile station apparatus 20 to the base station apparatus 10, and the "downlink frames" are frames that are transmitted from the base station apparatus 10 to the mobile station apparatus 20. The time length may differ between the uplink frames and the downlink frames.

The uplink frames are divided into a plurality of time slots (four time slots here) having predetermined time lengths. The downlink frames are also divided into the same number of time slots having predetermined time lengths. The nth time slot contained in each uplink frame corresponds to the nth time slot contained in each downlink frame (n=1 to 4). In communications between the base station apparatus 10 and mobile station apparatus 20, signals are transmitted and received using the corresponding time slots.

In cases in which communications are performed between a certain mobile station apparatus 20 and base station apparatus 10, communications are ordinarily performed using respectively corresponding time slots in terms of uplink and downlink as described above; in the present embodiment, however, communications can also be performed using a plurality of continuous time slots within the same frame. In the present embodiment, by thus using a plurality of time slots for a single communications operation, the communications rate is increased compared to a case in which a single time slot is used. Below, the time slot group used for a single communications operation will be referred to as connected time slots.

Furthermore, in mobile communications, the transmitting apparatus transmits with a control bit sequence included in each time slot. This control bit sequence is used so that a time slot containing this control bit sequence is received in the receiving apparatus. For instance, concrete examples of this control bit sequence include modulation scheme information that indicates the modulation scheme of the signal, synchronizing words for obtaining synchronization, information that specifies the receiving apparatus, and the like. This control bit sequence differs depending on scheme of the mobile communication system (PHS, iBurst (registered trademark), CDMA2000, or the like) or version of the system.

Furthermore, this modulation scheme information is information that is included in cases in which an adaptive modulation scheme is used. Specifically, the time slot header portion including the modulation scheme information is modulated using a predetermined modulation scheme, and the other portions than the header are modulated using a modulation scheme indicated by the modulation scheme information that indicates the modulation scheme determined by adaptive modulation. Furthermore, in cases in which an adaptive modulation scheme is used in which the modulation scheme of the time slot transmitted by the base station apparatus 10 is changed in accordance with instructions from the mobile station apparatus 20, it is not absolutely necessary that modulation scheme information be included, and it is likewise not necessary that the header portion of the time slot be modulated using a predetermined modulation scheme. In this case, the time slot as a whole may be modulated using a modulation scheme instructed by the mobile station apparatus 20.

As described above, the control bit sequence is ordinarily contained in each time slot. The reason for this is that since the control bit sequence is information that is to be transmitted from the transmitting apparatus to the receiving apparatus, each time slot is used for communications of a different mobile station apparatus 20. In this respect, in the connected time slots, the plurality of time slots making up the connected time slots are transmitted from the same transmitting apparatus to the same receiving apparatus. Accordingly, there is no need to include respective control bit sequences in the plurality of time slots that make up the connected time slots, and in the mobile communication system 1, some or all of the control bit sequences for the plurality of time slots that make up the connected time slots are represented by the control bit sequence of a single time slot. In other words, the control bit sequences for the connected time slots are set as the sequence for a single time slot.

In the present embodiment, as described above, the mobile station apparatus 20 determines whether or not some or all of the control bit sequences for the continuous plurality of time slots transmitted by the base station apparatus 10 are represented by the control bit sequence of a single time slot in accordance with the receiving environment of the signals received from the base station apparatus 10. Specifically, the mobile station apparatus 20 determines whether or not connected time slots are used for the downlink frames. Below, the configuration and functions used for this purpose will be described in detail with reference to the functional block diagram shown in FIG. 1, and with reference to FIGS. 2 through 5.

As is shown in FIG. 1, the base station apparatus 10 includes a transmission information acquiring part 11, a time slot generating part 12, a transmitting part 13, a receiving part 14, a time slot acquiring part 15, a reception information acquiring part 16, a request acquiring part 17, and a time slot control part 18. Furthermore, the mobile station apparatus 20 includes a receiving part 21, a time slot acquiring part 22, a reception information acquiring part 23, an S/N ratio acquiring part 24, an S/N ratio variation amount acquiring part 25, a request generating part 26, a transmission information acquiring part 27, a time slot generating part 28, and a transmitting part 29.

The transmission information acquiring part 11 acquires information (communication signals) transmitted to the mobile station apparatus 20 by the base station apparatus 10, and outputs this information to the time slot generating part 12.

The time slot generating part 12 generates time slots by assigning communication signals input from the transmission information acquiring part 11 to time slots determined by the time slot control part 18 described later. Furthermore, the time slot generating part 12 includes a control bit sequence in each of the generated time slots, or in each set of the generated connected time slots. The time slot generating part 12 outputs the time slots or connected time slot thus generated to the transmitting part 13.

The transmitting part 13 modulates the time slots or connected time slots input from the time slot generating part 12 using the modulation scheme instructed by the time slot control part 18 described later, and sequentially transmits these time slots as radio signals.

The receiving part 21 receives and demodulates the radio signals transmitted by the transmitting part 13. The receiving part 21 outputs the signals obtained by demodulation to the time slot acquiring part 22.

The time slot acquiring part 22 extracts the time slots from the signals input from the receiving part 21, and outputs these time slots to the reception information acquiring part 23.

The reception information acquiring part 23 respectively extracts the control bit sequences and the communication signals contained in the input time slots, and first determines whether or not the time slots input from the time slot acquiring part 22 are connected. In cases in which it is determined that these time slots are not connected, the reception information acquiring part 23 outputs the communication signals to a communication processing part not shown in the drawings, and performs processing in accordance with the control bit sequence for each time slot. Concrete examples of processing according to the control bit sequence include processing which determines whether or not the time slot has been transmitted to oneself, processing which determines the modulation scheme used for demodulation in the receiving part 21 in accordance with the modulation scheme information, and the like (in this case, the receiving part 21 demodulates the header portion of the time slot including the modulation scheme information using a predetermined modulation scheme, and demodulates the other portions than the header using a modulation scheme determined by the reception information acquiring part 23.

On the other hand, in cases in which it is determined that the time slots are connected, the reception information acquiring part 23 outputs the communication signals to a communication processing part not shown in the drawings, and performs processing according to a control bit sequence contained in one of the time slots for the respective time slots that make up the connected time slots.

The S/N ratio acquiring part 24 acquires receiving environment information that indicates the receiving environment of the respective time slots acquired by the time slot acquiring part 22. In the present embodiment, the S/N ratio (signal-to-noise ratio) which is information indicating the received power is used as this receiving environment information; however, the received power itself, error rate, or the like may also be used.

The S/N ratio variation amount acquiring part 25 acquires the amount of variation within the frame, of the receiving environment information acquired by the S/N ratio acquiring part 24. Below, this processing will be described with reference to FIGS. 2 through 5.

FIGS. 2 through 5 are schematic diagrams of the time slots or connected time slots that are transmitted and received between the base station apparatus 10 and mobile station apparatuses 20.

Figure 2:
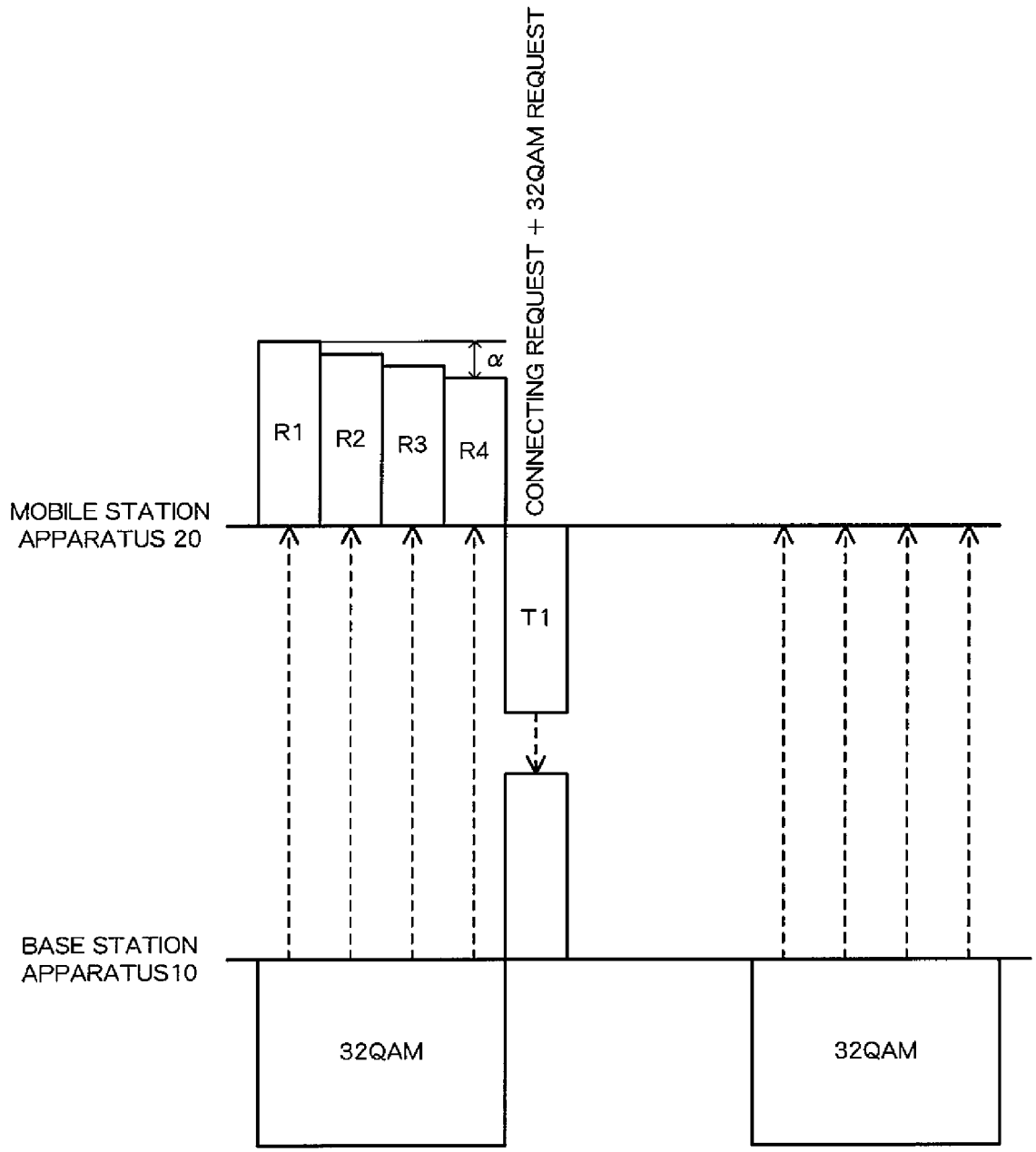
FIG. 2 is a explanatory diagram of time slot control according to an embodiment of the present invention.
Figure 3:
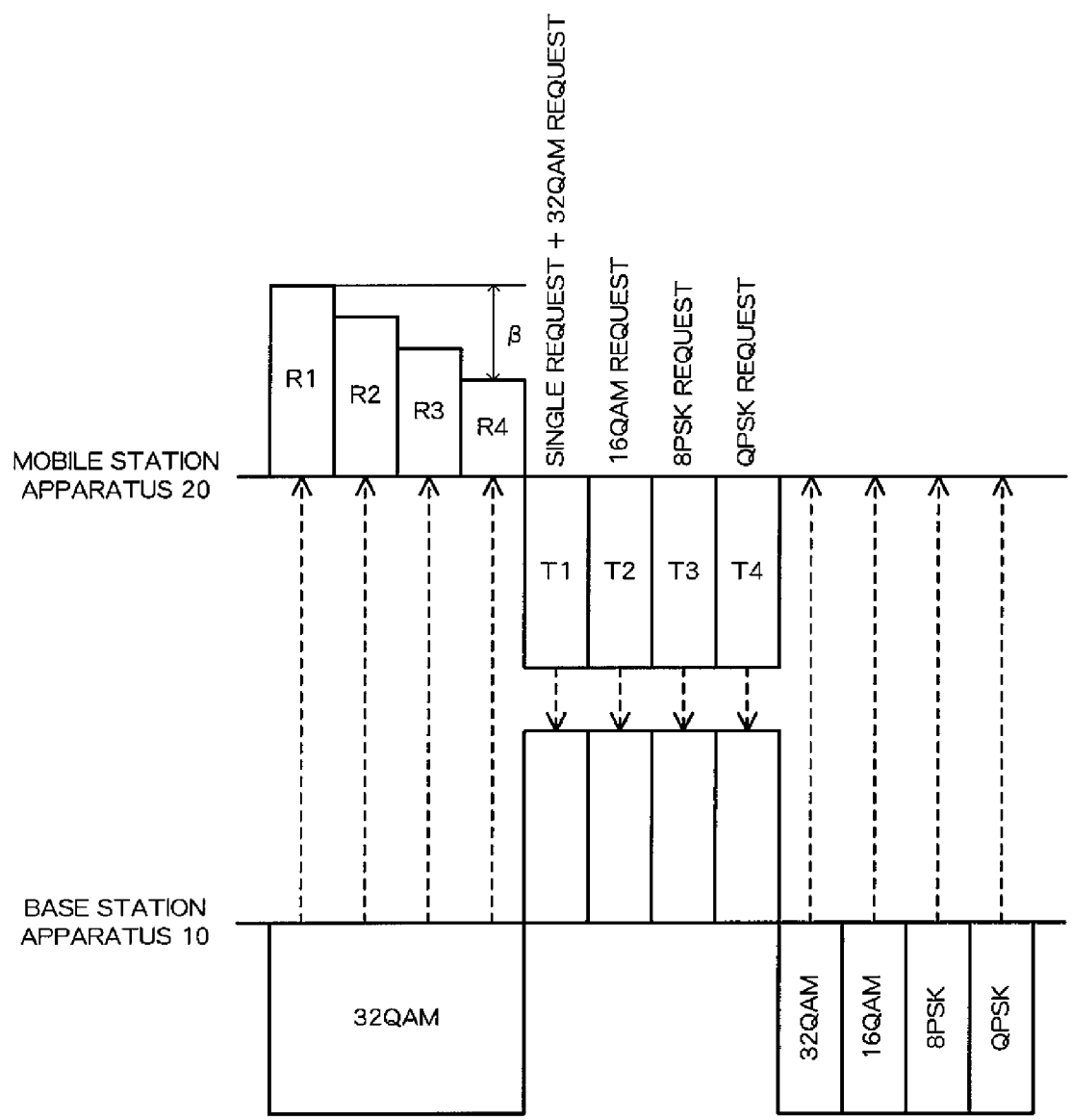
FIG. 3 is a explanatory diagram of time slot control according to an embodiment of the present invention.

In FIG. 2, the base station apparatus 10 transmits connected time slots modulated using 32QAM to a mobile station apparatus 20. The mobile station apparatus 20 receives the transmitted connected time slots; in this case, the S/N ratio acquiring part 24 acquires the S/N ratios of the respective time slots that make up the connected time slots (displayed as the time slots R1 through R4) Consequently, four S/N ratios can be acquired. The S/N ratio variation amount acquiring part 25 acquires the difference a between the maximum value and minimum value among these as the amount of variation. Furthermore, the S/N ratio variation amount acquiring part 25 may also acquire the difference between the first time slot R1 and last time slot R4 as the amount of variation. FIG. 3 is similar to FIG. 2, but the amount of variation β is greater than α.

Figure 4:
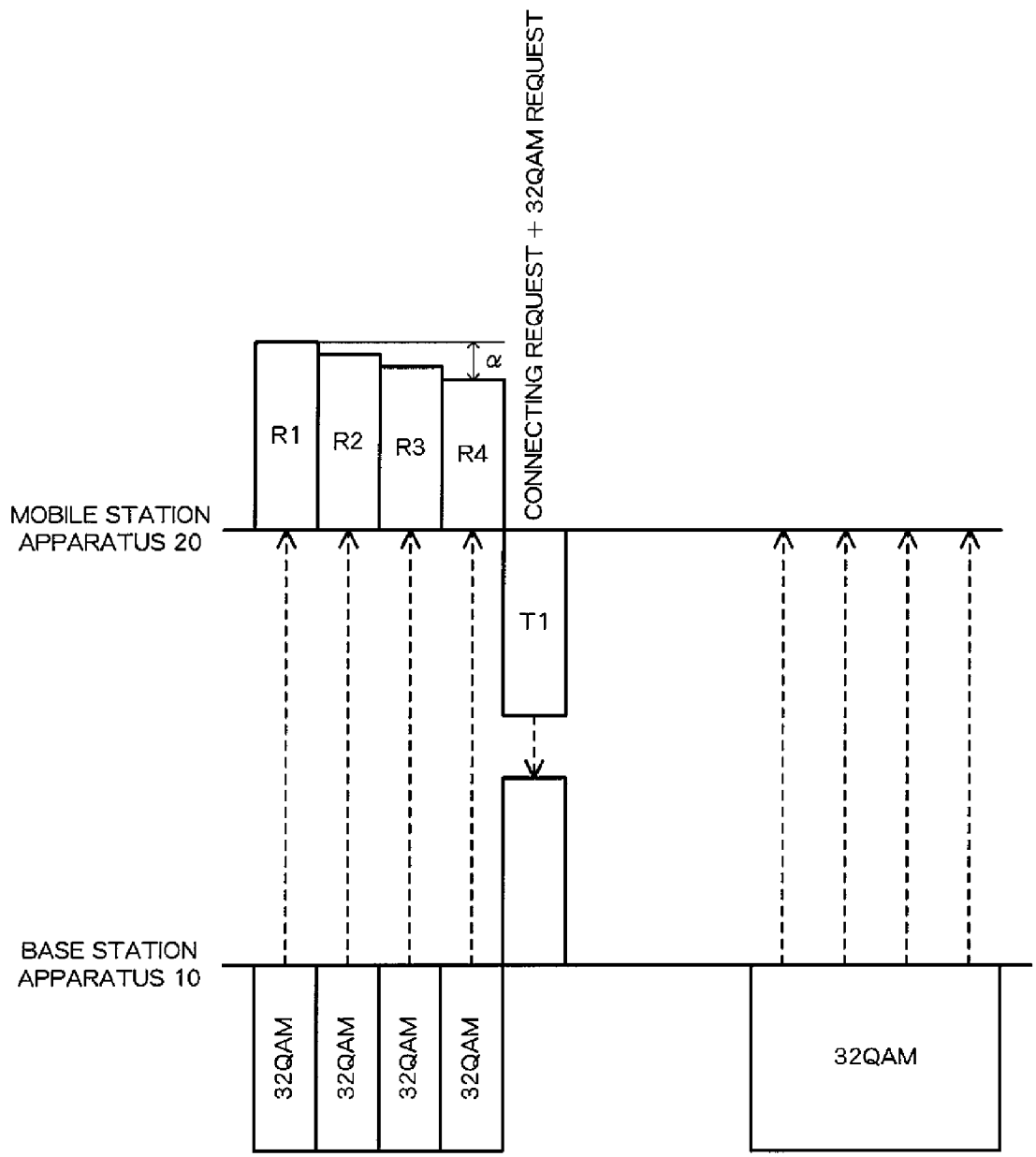
FIG. 4 is a explanatory diagram of time slot control according to an embodiment of the present invention.
Figure 5:
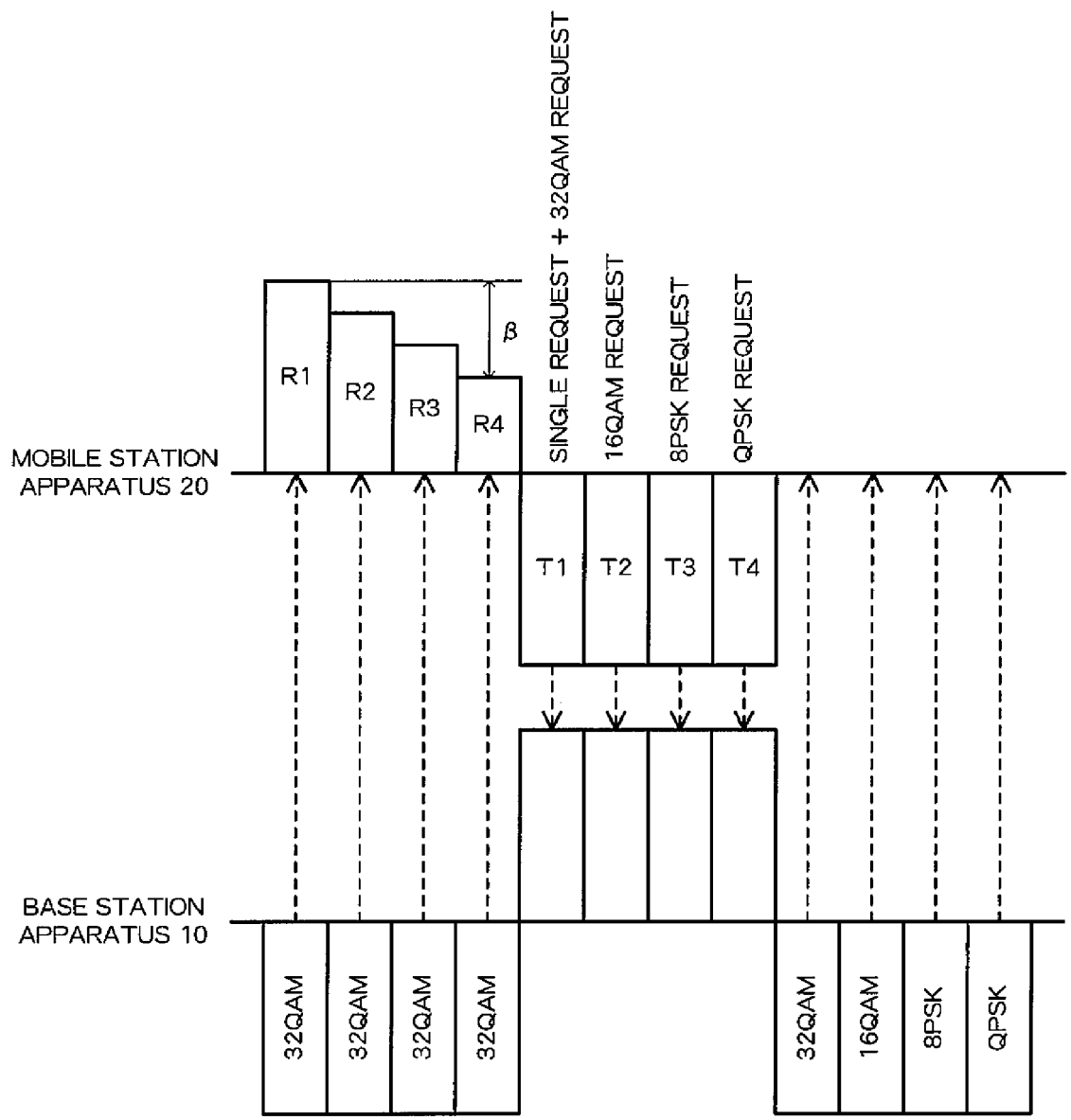
FIG. 5 is a explanatory diagram of time slot control according to an embodiment of the present invention.

In FIG. 4, the base station apparatus 10 transmits unconnected time slots of 32QAM to the mobile station apparatus 20. The mobile station apparatus 20 receives each of the transmitted time slots; in this case, the S/N ratio acquiring part 24 acquires the S/N ratios of the respective time slots. Consequently, four S/N ratios can be acquired. The S/N ratio variation amount acquiring part 25 acquires the difference a between the maximum value and minimum value among these as the amount of variation. Furthermore, as in the case of FIG. 2, the S/N ratio variation amount acquiring part 25 may also acquire the difference between the first time slot R1 and last time slot R4 as the amount of variation. FIG. 5 is also similar to FIG. 4, but the amount of variation β is greater than α.

On the basis of the variation amount thus acquired, the request generating part 26 determines whether or not at least some of the control bit sequences for the plurality of continuous time slots are represented by the control bit sequence of a single time slot. Specifically, the request generating part 26 determines whether or not the base station apparatus 10 is caused to use connected time slots. More concretely, in cases in which the amount of variation acquired is greater than a predetermined threshold value, the request generating part 26 determines that it is not the case that at least some of the control bit sequences for the plurality of connected time slots are represented by the control bit sequence of a single time slot, while in cases in which the amount of variation acquired is less than the predetermined threshold value, the request generating part 26 determines that at least some of the control bit sequences for the plurality of connected time slots are represented by the control bit sequence of a single time slot.

Furthermore, the request generating part 26 determines the modulation scheme used when the base station apparatus 10 transmits the time slots, on the basis of the receiving environment indicated by the receiving environment information acquired by the S/N ratio acquiring part 24. The communication rate differs according to the modulation scheme; however, since a modulation scheme with a higher communication rate is typically used, a better receiving environment is necessary in order to ensure that the time slots are received normally. Accordingly, the request generating part 26 determines the modulation scheme so that the modulation scheme that is used when the base station apparatus 10 transmits the time slots has a higher communication rate as the receiving environment indicated by the receiving environment information acquired by the S/N ratio acquiring part 24 is better.

Thus, the request generating part 26, which determines whether or not to cause the base station apparatus 10 to use connected time slots and which determines the modulation scheme used in communications, generates a request which contains these determination results and information indicating the determined modulation scheme. In concrete terms, in cases in which the base station apparatus 10 is caused to use connected time slots, slot connecting transfer requests (connecting requests) are generated, and in cases in which the base station apparatus 10 is not caused to used connected time slots, single slot transfer requests (single requests) are generated. Furthermore, requests that indicate the determined modulation scheme are generated, e.g., 32QAM requests in cases in which the determined modulation scheme is 32QAM, and 16QAM requests in cases in which the determined modulation scheme is 16QAM. Below, this processing will be described with reference again being made to FIGS. 2 through 5. Furthermore, this will be described for a case in which the amount of variation α is smaller than the above predetermined threshold value used as a determination criterion in order to determine whether or not the base station apparatus 10 is used to use connected time slots, and the amount of variation β is larger than the predetermined threshold value.

In FIG. 2, since the amount of variation is α, the request generating part 26 determines that the base station apparatus 10 is to be caused to use connected time slots. Furthermore, from the S/N ratios of the respective time slots, the request generating part 26 determines that the modulation scheme to be used when the base station apparatus 10 transmits the connected time slots is 32QAM. Accordingly, the request generating part 26 generates a slot connecting transfer request and a 32QAM request. In FIG. 4, the process is similar to that of FIG. 2.

In FIG. 3, since the amount of variation is β, the request generating part 26 determines that the base station apparatus 10 is not to be caused to use connected time slots. Furthermore, from the S/N ratios of the respective time slots (time slots R1 through R4), the request generating part 26 respectively determines that the modulation schemes to be used when the base station apparatus transmits the corresponding time slots (time slots R1 through R4 of the next downlink frame) are 32QAM, 16QAM, 8PSK, and QPSK. Accordingly, the request generating part 26 respectively generates a single slot transfer request, a 32QAM request, a 16QAM request, an 8PSK request, and a QPSK request. In FIG. 5, the process is similar to that of FIG. 3.

Thus, the request generating part 26 generates requests for the base station apparatus 10, and outputs these requests to the transmission information acquiring part 27.

The transmission information acquiring part 27 acquires the information (communication signals) transmitted to the base station apparatus 10 by the mobile station apparatus 20, and outputs this information to the time slot generating part 28. The transmission information acquiring part 27 acquires information indicating the respective requests input from the request generating part 26 as some of these communication signals.

The time slot generating part 28 generates time slots containing the communication signals input from the transmission information acquiring part 11. Furthermore, in cases in which the request generating part 26 generates single slot transfer requests, the time slot generating part 28 includes requests indicating the modulation scheme determined for the time slots Rn (n=1 to 4) by the request generating part 26 in the corresponding time slots Tn (n=1 to 4) as shown in FIG. 3 or FIG. 5. The time slot generating part 28 outputs the time slots thus generated to the transmitting part 29.

The transmitting part 29 modulates the time slots input from the time slot generating part 28, and sequentially transmits these time slots as radio signals.

The receiving part 14 receives and demodulates the radio signals transmitted by the transmitting part 29. The receiving part 14 outputs the signals obtained by demodulation to the time slot acquiring part 15.

The time slot acquiring part 15 extracts the time slots from the signals input from the receiving part 14, and outputs these time slots to the reception information acquiring part 16.

The reception information acquiring part 16 respectively extracts the control bit sequences and the communication signals contained in the input time slots, outputs the communication signals to a communication processing part not shown in the drawings, and performs processing according to the control bit sequences for the respective time slots.

The request acquiring part 17 acquires the above requests from the communication signals output to the communication processing part by the reception information acquiring part 16, and outputs these requests to the time slot control part 18.

The time slot control part 18 operates so that at least some of the control bit sequences for the continuous plurality of time slots are represented by the control bit sequence of a single time slot when the time slots are transmitted, in accordance with the respective requests input from the request acquiring part 17. In concrete terms, the system is devised so that in a case in which a slot connecting transfer request is included in the requests input from the request acquiring part 17, at least some of the control bit sequences for the continuous plurality of time slots are represented by the control bit sequence of a single time slot (i.e., connected time slots are used) when time slots are transmitted. On the other hand, the system is not devised so that in a case in which a single slot transfer request is included in the requests input from the request acquiring part 17, at least some of the control bit sequences for the continuous plurality of time slots are represented by the control bit sequence of a single time slot (i.e., connected time slots are not used) when time slots are transmitted.

In cases in which a decision is made to use connected time slots, the time slot control part 18 controls the time slot generating part 12 so that a control bit sequence is assigned to a portion of one of the time slots making up the connected time slots, and so that communication signals are assigned to the remaining portions of this time slot and to the other time slots. On the other hand, in cases in which a decision is not made to use connected time slots, the time slot control part 18 controls the time slot generating part 12 so that control bit sequences and communication signals are assigned to the respective time slots.

Furthermore, the time slot control part 18 gives instructions for the modulation scheme of the respective time slots to transmitting part 13 in accordance with the respective requests input from the request acquiring part 17.

As a result of the above, 32QAM connected time slots are transmitted in the succeeding downlink frames in FIGS. 2 and 4, and four time slots are transmitted in succeeding downlink frames in FIGS. 3 and 5.

Among the processing described above, the processing that determines whether or not connected time slots will be used will be described again in detail with reference to the process flowchart for the mobile station apparatus 20.

Figure 6:
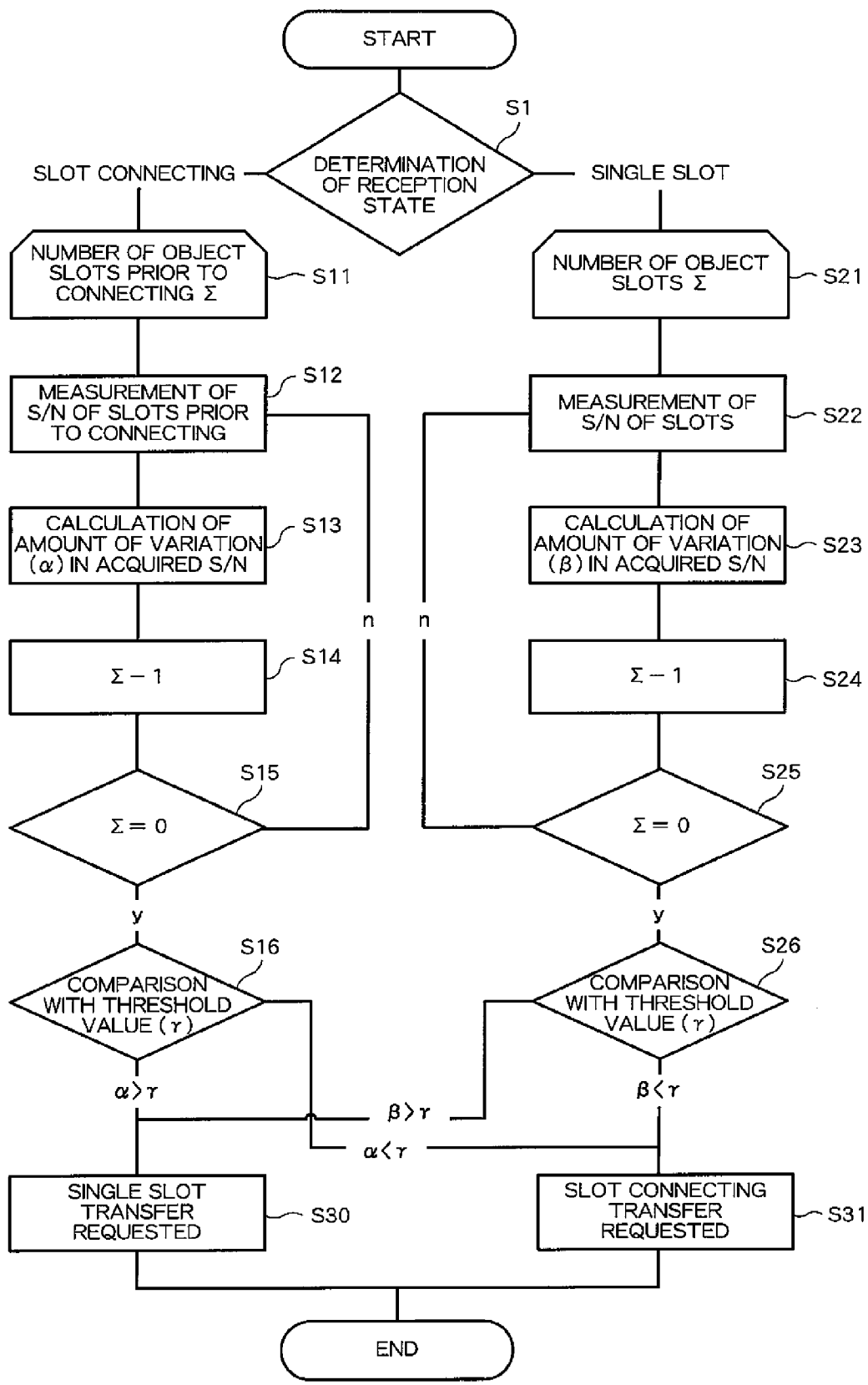
FIG. 6 is a diagram showing the flow of a process according to an embodiment of the present invention.

FIG. 6 is a diagram showing the process flow of the mobile station apparatus 20. As shown in this diagram, the mobile station apparatus 20 first determines the reception state (SI). Specifically, the mobile station apparatus 20 determines whether or not the received signal has been received as connected time slots. In cases in which the received signal has been received as connected time slots, the mobile station apparatus 20 performs the processing of S12 and S13 for the respective time slots contained in the connected time slots (S11, S14, S15). Here, furthermore, the connection of the time slots will be described as being performed in each frame.

Similarly, in cases in which the received signal is not received as connected time slots as well, the mobile station apparatus 20 performs the processing of S22 and S23 for the respective time slots contained in the downlink frame (S21, S24, S25).

In the processing of S12, the mobile station apparatus 20 measures the S/N ratios of the time slots prior to connection (the respective time slots making up the connected time slots). The mobile station apparatus 20 calculates the amount of variation in the S/N ratios thus measured from the S/N ratios already measured in a similar manner (S13). When the measurement of the S/N ratios of all of the time slots contained in the connected time slots is completed in S12, the amount of variation calculated in the subsequent S13 is an amount of variation that reflects the S/N ratios of all of the time slots contained in the connected time slots. Here, this amount of variation is designated as $\alpha$.

When the amount of variation $\alpha$ is calculated, the mobile station apparatus 20 compares $\alpha$ and a threshold value $\gamma$ stored beforehand (S16). In cases in which $\alpha$ is greater than $\gamma$, the mobile station apparatus 20 determines that connected time slots will not be used, and requests single slot transfer (S30). In cases in which $\alpha$ is smaller than $\gamma$, the mobile station apparatus 20 determines that connected time slots will be used, and requests slot connecting transfer (S31).

In the processing of S22, the mobile station apparatus 20 measures the S/N ratios of the respective time slots (the respective time slots contained in the downlink frame). The mobile station apparatus 20 calculates the amount of variation of the S/N ratios thus measured from the S/N ratios already measured in a similar manner (S23). When the measurement of the S/N ratios of all of the time slots contained in the downlink frame is completed in S22, the amount of variation calculated in the subsequent S23 is an amount of variation that reflects the S/N ratios of all of the time slots contained in the downlink frame. This amount of variation is designated as $\beta$.

When the amount of variation $\beta$ is calculated, the mobile station apparatus 20 compares $\beta$ and a threshold value $\gamma$ stored beforehand (S26). In cases in which $\beta$ is greater than $\gamma$, the mobile station apparatus 20 determines not to use connected time slots, and requests a single slot transfer (S30). In cases in which $\beta$ is smaller than $\gamma$, the mobile station apparatus 20 determines to use connected time slots, and requests a slot connecting transfer (S31).

In this way, the mobile station apparatus 20 can determine whether or not to use a slot connecting transfer system on the basis of the amount of variation in the receiving environment. Accordingly, the mobile station apparatus 20 obtains an appropriate receiving environment in the mobile communication system 1 using a slot connecting transfer system.

The present invention is not limited to the embodiment described above. For example, in the above embodiment, the mobile station apparatus 20 determines whether or not to cause the base station apparatus 10 to use connected time slots on the basis of the amount of variation in the receiving environment. Conversely, it would of course also be possible for the base station apparatus 10 to determine whether or not to cause the mobile station apparatus 20 to use connected time slots on the basis of the amount of variation in the receiving environment. Furthermore, in the above embodiment, connected time slots are made up from all of the time slots contained in one frame; however, it would also be possible to make up connected time slots from only some of these time slots.

Furthermore, the present invention is not limited to mobile communication systems; the present invention may be applied to any communication system using time division multiplex.

The invention claimed is:

1. A time slot control method wherein in a communication system having a first communication apparatus and a second communication apparatus, the first communication apparatus transmits time slots to the second communication apparatus by time division multiplex, the time slot control method comprising:
   a transmitting step of sequentially transmitting time slots having a communication signal from the first communication apparatus to the second communication apparatus;
   a receiving environment information acquisition step of acquiring receiving environment information that indicates a receiving environment of each of the transmitted time slots in the second communication apparatus;
   a determining step of determining whether or not the first communication apparatus and the second communication apparatus are to communicate in a continuous plurality of time slots and that all of control bit sequences for the continuous plurality of time slots are to be represented by a control bit sequence of a single time slot on the basis of an amount of variation in the receiving environment indicated by the acquired receiving environment information among the time slots; and
   a time slot control step of operating so that all of the control bit sequences for the continuous plurality of time slots are represented by the control bit sequence of the single time slot when the first communication apparatus transmits the time slots in the transmitting step, in accordance with the determination results in the determining step.

2. The time slot control method of claim 1, wherein in the determining step, in a case in which the amount of variation in the receiving environment indicated by the acquired receiving environment information among the time slots is greater than a predetermined threshold value, it is determined that at least some of the control bit sequences for a continuous plurality of time slots are not represented by the control bit sequence of a single time slot.

3. The time slot control method of claim 1 or 2, further comprising:
   a modulation scheme determination step of determining a modulation scheme used when time slots of the time slots to be transmitted are transmitted in the transmitting step, on the basis of the receiving environment indicated by the acquired receiving environment information; wherein
   in the transmitting step, the determined modulation scheme is used for the time slots to be transmitted in the transmitting step by the first communication apparatus.

4. The time slot control method of claim 3, wherein the receiving environment information acquisition step acquires information indicating received power in the second communication apparatus for each of the transmitted time slots as the receiving environment information.

5. A communication system comprising a first communication apparatus and a second communication apparatus, wherein
   the first communication apparatus comprises:
   transmitting means for sequentially transmitting time slots by time division multiplex; and
   the second communication apparatus comprises:
   receiving environment information acquisition means for acquiring receiving environment information that indicates a receiving environment of each of the transmitted time slots;
   determining means for determining whether or not the first communication apparatus and the second communication apparatus are to communicate in a continuous plurality of time slots and that all of control bit sequences for the continuous plurality of time slots are to be represented by a control bit sequence of a single time slot on the basis of an amount of variation in the receiving environment indicated by the acquired receiving environment information among the time slots; and
   time slot control means for operating so that all of the control bit sequences for the continuous plurality of time slots are represented by the control bit sequence of the single time slot when the first communication apparatus transmits the time slots using the transmitting means, in accordance with the determination results of the determining means.

6. A communication apparatus comprising:
   receiving means for sequentially receiving time slots by time division multiplex from another communication apparatus;
   receiving environment information acquisition means for acquiring receiving environment information that indicates the receiving environment of the sequentially received time slots;
   determining means for determining whether or not the communication apparatus and the another communication apparatus are to communicate in a continuous plurality of time slots and that all of control bit sequences for the continuous plurality of time slots are to be represented by a control bit sequence of a single time slot on the basis of the amount of variation in the receiving environment indicated by the acquired receiving environment information among the time slots; and
   transmitting means for transmitting information indicating results of the determination to the another communication apparatus.

7. A non-transitory computer-readable storage medium storing a program for making a computer function, the function comprising:
   receiving, sequentially, by a communication apparatus, time slots by time division multiplex from another communication apparatus;
   acquiring receiving environment information that indicates the receiving environment of the sequentially received time slots;
   determining whether or not the communication apparatus and the another communication apparatus are to communicate in a continuous plurality of time slots and that all of control bit sequences for the continuous plurality of time slots are to be represented by a control bit sequence of a single time slot on the basis of an amount of variation in the receiving environment indicated by the acquired receiving environment information among the time slots; and
   transmitting information indicating results of the determination to the another communication apparatus.

* * * * *